(12) United States Patent
McDermid (10) Patent No.: US 10,061,462 B2
(45) Date of Patent: Aug. 28, 2018

(54) TOUCH SENSOR FABRIC

(71) Applicant: William James McDermid, Niwot, CO (US)

(72) Inventor: William James McDermid, Niwot, CO (US)

( * ) Notice: Subject to any disclaimer, the term of this patent is extended or adjusted under 35 U.S.C. 154(b) by 707 days.

(21) Appl. No.: 14/599,525

(22) Filed: Jan. 18, 2015

(65) Prior Publication Data
US 2016/0209964 A1 Jul. 21, 2016

(51) Int. Cl.
| | |
|---|---|
| *D03D 3/00* | (2006.01) |
| *G06F 3/047* | (2006.01) |
| *D03D 1/00* | (2006.01) |
| *G06F 1/16* | (2006.01) |
| *D03D 15/00* | (2006.01) |

(52) U.S. Cl.
CPC ........... *G06F 3/047* (2013.01); *D03D 1/0088* (2013.01); *D03D 15/0094* (2013.01); *G06F 1/16* (2013.01); *D03D 2700/0166* (2013.01)

(58) Field of Classification Search
USPC ................... 442/173, 179, 189; 345/174
See application file for complete search history.

(56) References Cited

U.S. PATENT DOCUMENTS

| | | | | |
|---|---|---|---|---|
| 4,309,479 A | * | 1/1982 | Naruse .................. | D01F 1/09 428/367 |
| 2004/0087231 A1 | * | 5/2004 | Nakanishi ............ | A43B 7/1455 442/179 |
| 2005/0069695 A1 | * | 3/2005 | Jung ..................... | D03D 1/0088 428/328 |
| 2007/0080773 A1 | * | 4/2007 | Tang ...................... | G06F 3/045 338/25 |
| 2010/0219943 A1 | * | 9/2010 | Vanska .................. | G06F 1/163 340/407.1 |
| 2011/0318985 A1 | * | 12/2011 | McDermid ............ | D02G 3/441 442/189 |
| 2013/0190052 A1 | * | 7/2013 | Lundell ................ | H04M 1/0262 455/566 |
| 2014/0150573 A1 | * | 6/2014 | Cannard ................ | G01L 1/18 73/862.627 |
| 2015/0261310 A1 | * | 9/2015 | Walmsley ............. | G06F 1/1626 345/173 |
| 2016/0048235 A1 | * | 2/2016 | Poupyrev .............. | G06F 3/044 345/174 |
| 2017/0370030 A1 | * | 12/2017 | Podhajny ............. | D03D 1/0088 |

FOREIGN PATENT DOCUMENTS

WO    WO2016105885    *    6/2016    ......... D10B 2401/16

* cited by examiner

*Primary Examiner* — Nina Bhat (57) ABSTRACT

A method and apparatus are provided for a touch sensor made from a combination of conductive and non-conductive fibers. The fibers are woven into a fabric wherein non-conductive fibers keep horizontal conductive fibers from contacting vertical conducting fibers unless a touch is applied. The conductive fibers are grouped into horizontal and vertical strips and the fibers in a strip are connected together throughout the fabric. The ends of the strips are connected to control electronics that drive signals to the sensor fabric and measure signals from the sensor fabric to determine touch locations and touch contact areas.

6 Claims, 11 Drawing Sheets

TOUCH SENSOR FABRIC

CROSS REFERENCE TO RELATED APPLICATIONS

This application is related to U.S. Pat. No. 8,758,536, filed Apr. 22, 2008 and entitled "METHOD AND APPARATUS FOR DETERMINING COORDINATES OF SIMULTANEOUS TOUCHES ON A TOUCH SENSOR PAD", and U.S. patent application Ser. No. 13/166,812, filed Sep. 2, 2012 and entitled "TOUCH SENSOR FABRIC", which are by the same inventor and hereby incorporated by reference.

This non-provisional application claims priority to U.S. provisional application 61/924,259 filed on Feb. 4, 2014, which is incorporated herein by reference.

BACKGROUND OF THE INVENTION

1. Field of the Invention

This invention relates to a unique fabric woven with a combination of conductive and non-conductive fibers that functions as a touch sensor. This invention further relates to a method for connecting control electronics to the fabric that are able to measure the location and determine the contact area of multiple, simultaneous touch events on the fabric.

2. Statement of the Problem

Touch input sensors and controllers are becoming common as user input devices to control computers, cell phones, and other electronic devices. When a touch sensor is transparent and placed in front of a display, the sensor-display assembly is a touch-screen. A touch sensor without a display can be opaque and is a touch-pad.

Different technologies exploit various parameters of layered materials to make sensors. Resistive sensors are constructed to hold two linearly resistive layers apart at rest that are allowed to come into contact upon a touch event. The resistor dividers resulting from the touch are read by control electronics and a location is calculated. Capacitive sensors are constructed from conductive layers that are driven by signals to generate an electric field. When the base capacitance is altered by another electric field, such as a user's finger, the differences are measured by control electronics and a location is calculated. Inductive sensors are driven by signals to generate a magnetic field. When the magnetic field is altered by another magnetic field, such as a stylus with a coil, the differences are measured by control electronics and a location is calculated. Surface Acoustic Wave sensors use transducers to initiate mechanical waves in a sensor, and process the reflected wave pattern to look for changes caused by touch points reflecting and/or absorbing the wave energy. IR sensors shine a grid of beams across the sensor surface that is monitored on opposing sides. A touch breaks the beam and the control electronics determine a location.

Of these sensor technologies, resistive has distinct advantages. Resistive sensors are like mechanical switches so respond to touches from all actuators including fingers, even when gloved, and common implements such as pencils and pens. A touch is not ambiguous because the same pressure that informs the electronics of a touch informs the user of a touch. Resistive also has a high signal to noise ratio allowing for the possibility of high resolution.

Major problems of resistive touch sensors are optical clarity when used as a touch-screen in front of a display and robust function in the field for either touch-screen or touch-pad applications. This invention focuses on touch-pad applications for the technology so optical clarity is not important, though those skilled in the art can apply this invention to touch-screens. The problem with the robustness of traditional resistive sensors is due to the need to maintain a thin air gap between the layers of the sensor at rest, but allow the layers to come into contact with one another upon a touch event.

Maintaining a thin air gap is particularly difficult when the sensor is large. For example, when the sensor is used as a large screen for a projected display in an interactive white board application. Maintaining a thin air gap is also a problem when the sensor needs to conform to a non-planer surface such as when draped on a user's leg or applied to a contoured surface in an automobile.

One way to overcome these air gap challenges is to make a sensor by weaving fibers with a specialty cross section made up of conductive and non-conducive regions into a fabric where the non-conductive regions keep the conductive regions of crossing fibers apart when at rest but allow the conductive regions to come into contact under the pressure of a touch. The specialty cross section, however, introduces complexity to the weaving process as the orientation of the fiber in the weave needs to be controlled. Also, non-linearities in the resistance of the conductive region of the fiber hinders the ability of control electronics to accurately determine touch locations.

Summary of the Solution

The present invention solves the above and other problems by making a sensor by weaving a combination of conductive and non-conductive round fibers in a specific pattern so that the non-conductive fibers keep the crossing conductive fibers apart under rest but allow them to come into contact when an external touch applies pressure normal to the plane of the sensor. The conductive fibers are grouped into strips that are in turn connected to control electronics that determine the location of a touch where crossing conductive fibers come into contact.

Aspects

An aspect of the invention is how horizontal and vertical conductive signal fibers are woven into a fabric with non-conductive fibers that keep the crossing horizontal and vertical conductive signal fibers apart when at rest but allow horizontal conductive signal fibers to contact vertical conductive signal fibers when the external compressive force of a touch is applied to the fabric.

Another aspect of the invention is how conductive connecting fibers are added to the weave to overcome resistance variations among the conductive signal fibers where horizontal conductive connecting fibers connect vertical conductive signal fibers without contacting horizontal conductive signal fibers and where vertical conductive connecting fibers connect horizontal conductive signal fibers without contacting vertical conductive signal fibers Preferably, the conductive connecting fibers have a resistance substantially lower than the conductive signal fibers.

Another aspect of the invention is how horizontal conductive signal fibers are grouped into horizontal strips and vertical conductive signal fibers are grouped into vertical strips and where said strips are electrically isolated from one another by cutting the conductive connecting fibers between them.

Preferably, the means for cutting conductive connecting fibers is by heating a wire woven into the fabric perpendicular the conductive connecting fibers where the hot wire melts the conductive connecting fibers it comes into contact with.

Preferably, the conductive connecting fibers melt at a lower temperature than the other fibers in the fabric.

Preferably, the melting material at the newly created ends forms a cap at the ends so the broken fiber does not unravel in the weave.

Another aspect of the invention is how a ribbon composed of a flexible circuit assembly is woven into the fabric along with the fibers at locations that break the fabric into discrete touch sensors where the ribbons become the edges of said touch sensors and where fibers within a strip are connected to a pad on the flexible circuit, and where each strip is connected to a separate pad.

Preferably, the fibers of adjacent strips cross the ribbon on opposite sides of the ribbon so the pads the strip fibers connect to can be oversized, thereby loosening alignment requirements while keeping adjacent pads from shorting to one another.

Preferably, the fabric is cut into distinct touch sensors by cutting along the length of the ribbons.

Preferably, the vertical ribbons are connected to the horizontal ribbons through connectors fitted in the corners of the distinct touch sensors.

Another aspect of the invention is the method for detecting all crossing strips experiencing a touch comprising the steps of: drive all strips in a first orientation to a positive voltage and tie one end of the strips in a second orientation to ground; read the voltages at the other end to determine which strips in a second orientation are experiencing a touch; in turn, drive strips in a second orientation that experienced a touch to a positive voltage and tie one end of the strips in a first orientation to ground; read the voltages at the other end to determine which strips in a first orientation are contacting the currently driven strip in the second orientation.

Preferably, the means for detecting which fiber in a first strip is contacting a fiber in a second crossing strip is to set up a voltage gradient down the second strip and read the voltage of the first strip. If the voltages of the edge fibers in the first strip are known through a prior calibration process, the position of the contacting fiber in the first strip can be calculated through interpolation.

Another aspect of the invention is how the contact area of a touch is determined by measuring a resistance change due to fibers being shorted together at the touch point.

Preferably, the means for measuring the resistance change is to drive a first strip with a constant current source at one end and connect the other end to ground. As the contact area between the first strip and a crossing second strip gets larger, the resistance of the first strip is reduced due to the second strip effectively adding a parallel resistance path in the area of the touch resulting in a lower voltage at the current source connection.

Another aspect of the invention is how the sensor can be put into a low power sleep mode that draws no current while there are no touches and can wake from the sleep mode by detecting a current that begins to flow in response to a touch.

Preferably, the means for putting the sensor into a low power sleep mode is to tie the ends of the strips in a first orientation to ground and tie the ends of the strips in a second orientation to power. Upon a touch, current will begin to flow which is detected and treated as a wake-up event.

DESCRIPTION OF THE DRAWINGS

The above and other advantages and features of the invention may be better understood from a reading of the detailed description taken in conjunction with the drawings. The same reference number represents the same element on all drawings.

DETAILED DESCRIPTION OF THE INVENTION

FIGS. 1-17 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
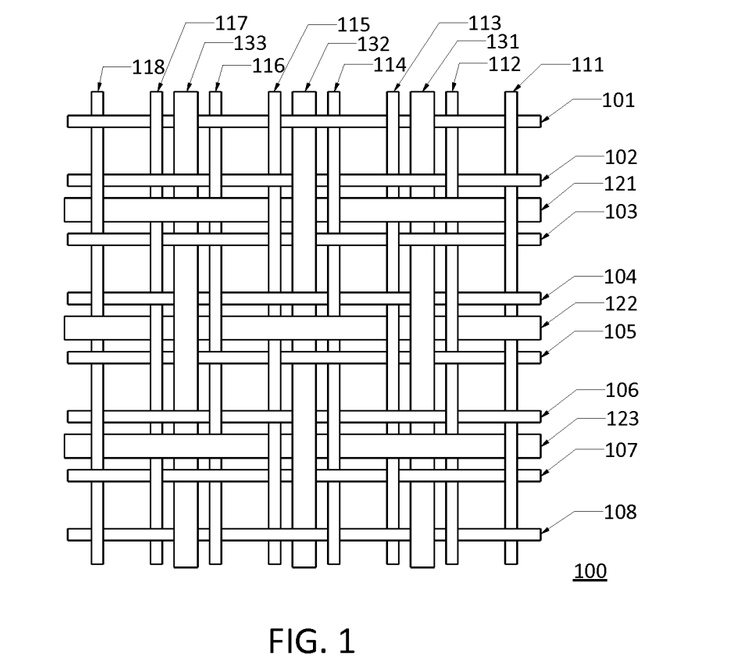
FIG. 1 is a top view of a section of a touch sensor fabric where all the conductive fibers are isolated from one another.
Figure 2:
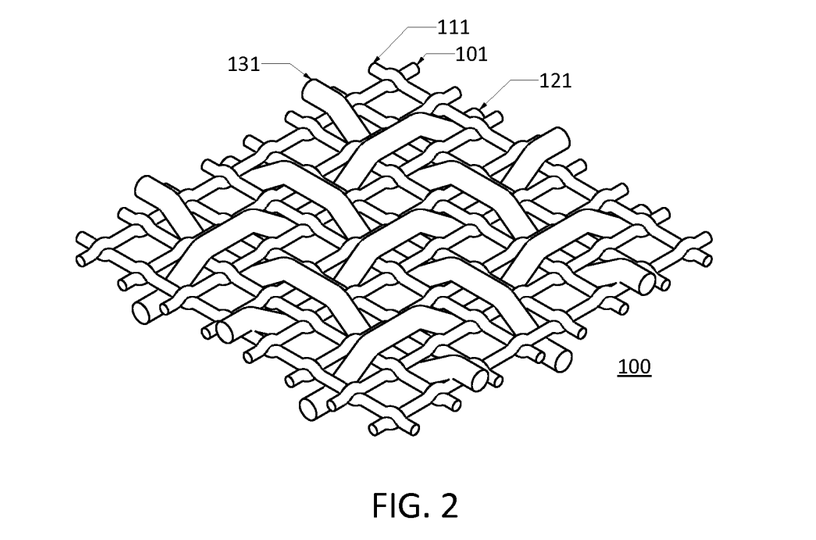
FIG. 2 is a top isometric view of the fabric from FIG. 1.

FIG. 1 shows a top view of fabric 100 made up of a weave of non-conductive horizontal fibers 101-108, non-conductive vertical fibers 111-118, horizontal signal fibers 121-123, and vertical signal fibers 131-133. FIG. 2 is a top isometric view of fabric 100 showing how the mesh made from the non-conductive fibers keep the horizontal conductive signal fibers away from vertical conductive signal fibers when there is no pressure on fabric 100 from a touch.

Figure 3:
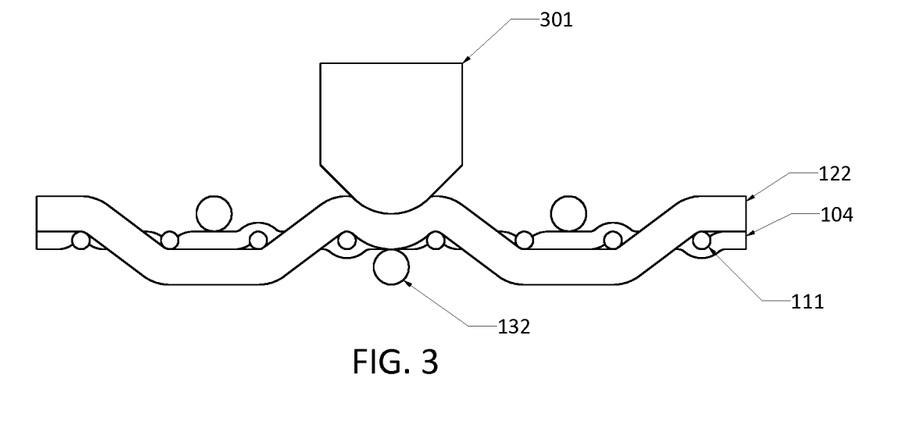
FIG. 3 is a cross section view of the fabric from FIG. 1 showing the effects of a touch event.

FIG. 3 is a cross section view of fabric 100 with touch implement 301 bringing horizontal conductive signal fiber 122 in contact with vertical conducive signal fiber 132.

Figure 4:
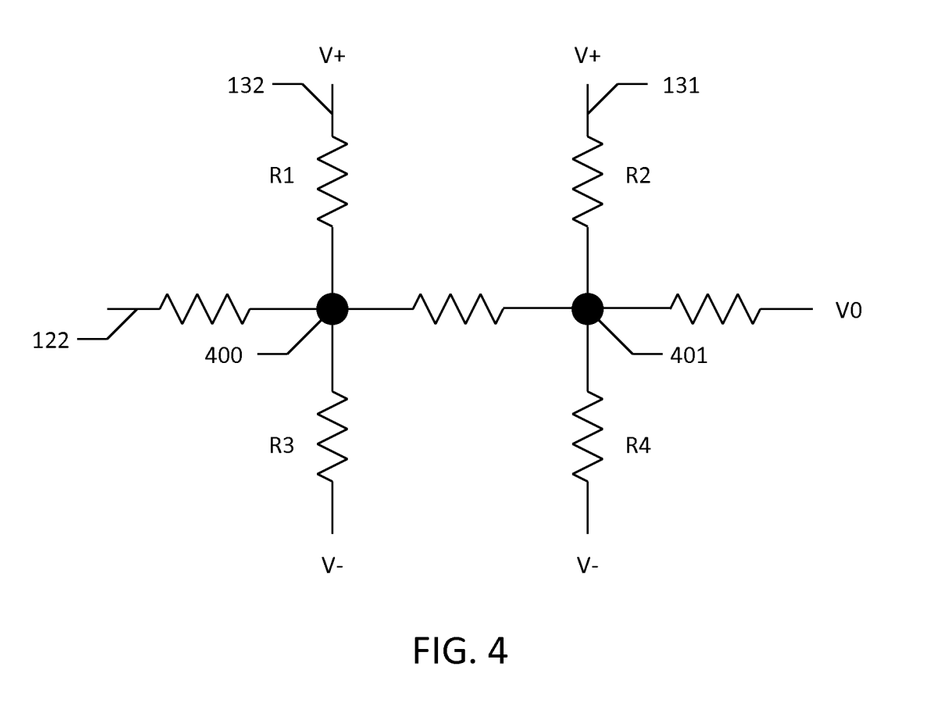
FIG. 4 is a schematic representation of the touch event from FIG. 3.

FIG. 4 shows an electrical schematic equivalent of vertical conductive signal fibers 131 and 132 with horizontal conductive signal fibers 122. Locations 400 and 401 are potential touch locations. The diagram demonstrates how vertical location of touch 400 can be determined by setting up a voltage gradient down vertical conductive signal fiber 132 and reading the voltage V0 at the end of horizontal conductive signal fiber 122. A limitation of fabric 100 arises when reading touch 401 if there is any variation in the resistances of the vertical conductive signal fibers. If the ratio of R2 to R4 does not match the ratio of R1 to R3 then V0 will be different even though the vertical positions of touch 400 and 401 are the same. A calibration process could be employed to make corrections, but this is not practical when thousands of fibers would need to be calibrated all along their length.

Figure 5:
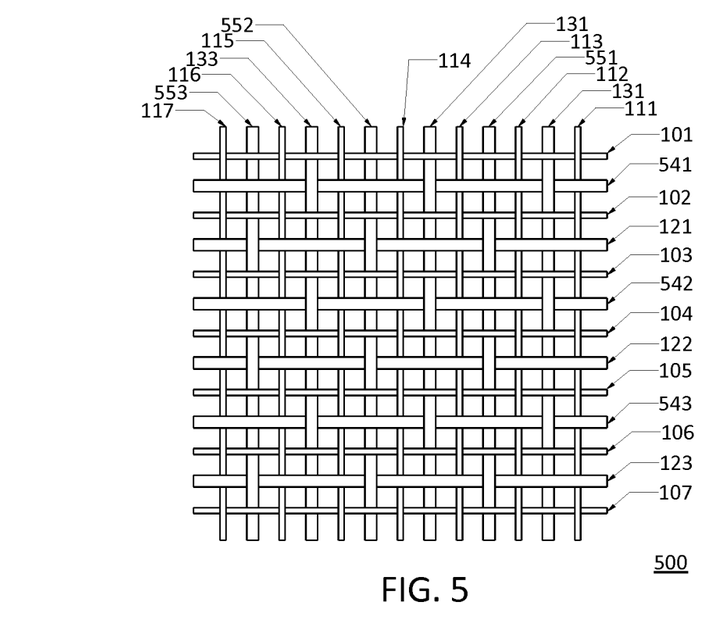
FIG. 5 is a top view of a section of a touch sensor fabric where vertical conductive connecting fibers connect the horizontal conductive signal fibers to one another and horizontal conductive connecting fibers connect the vertical conductive signal fibers to one another.
Figure 6:
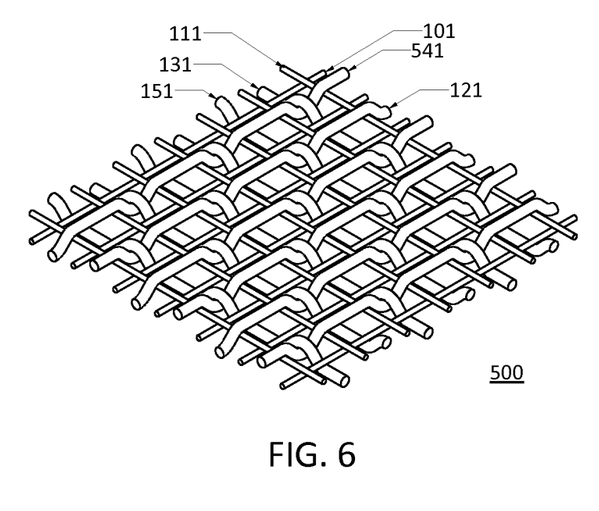
FIG. 6 is a top isometric view of the fabric from FIG. 5.

Fabric 500 in FIG. 5 addresses this limitation by modifying the weave and adding vertical conductive connection fibers 551-553 and horizontal conductive connecting fibers 541-543. The isometric view of fabric 500 in FIG. 6 shows how vertical conductive connection fibers 551-553 connect horizontal conductive signal fibers 121-123 together while contacting neither vertical conductive signal fibers 131-133 nor horizontal conductive connection fibers 541-543. Likewise, horizontal conductive connection fibers 541-543 connect vertical conductive signal fibers 131-133 together while contacting neither horizontal conductive signal fibers 121-123 nor vertical conductive connection fibers 551-553. If conductive connecting fibers have a substantially lower resistance than conductive signal fibers, then the resistance variations of the signal fibers between connecting fibers are averaged out.

Because all the horizontal conductive signal fibers are connected together throughout the weave and vertical conductive signal fibers are connected together throughout the weave, fabric 500 functions like a 4-wire, resistive, single touch sensor. To make it into a resistive multi-touch sensor, the horizontal conductive signal fibers connected by vertical conductive connecting fibers need to be broken into horizontal, multi-fiber strips and the vertical conductive signal fibers connected by horizontal conductive connecting fibers need to be broken into vertical, multi-fiber strips.

Figure 7:
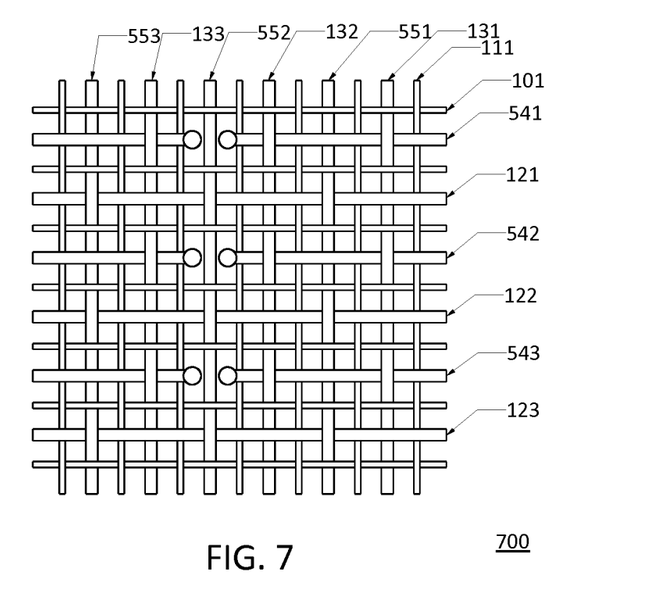
FIG. 7 is a top view of the fabric from FIG. 5 with horizontal connecting fibers cut.

Fabric 700 in FIG. 7 shows how the vertical strips can be formed by cutting horizontal conductive connecting fibers 541-543, thereby electrically isolating vertical conductive signal fibers and horizontal conductive connecting fibers from those in adjacent strips. Likewise, horizontal strips can be formed by cutting vertical conductive connecting fibers, thereby electrically isolating horizontal conductive signal fibers and vertical conductive connecting fibers from those in adjacent strips. Though this may introduce the same resistance variation limitation evident in fabric 100, a calibration process carried out on a far fewer number of multi-fiber strips is easily managed.

Figure 8:
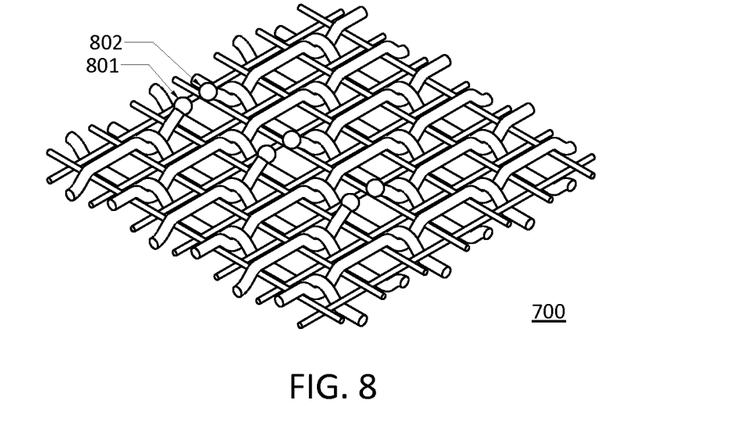
FIG. 8 is a top isometric view of the fabric from FIG. 7.
Figure 9:
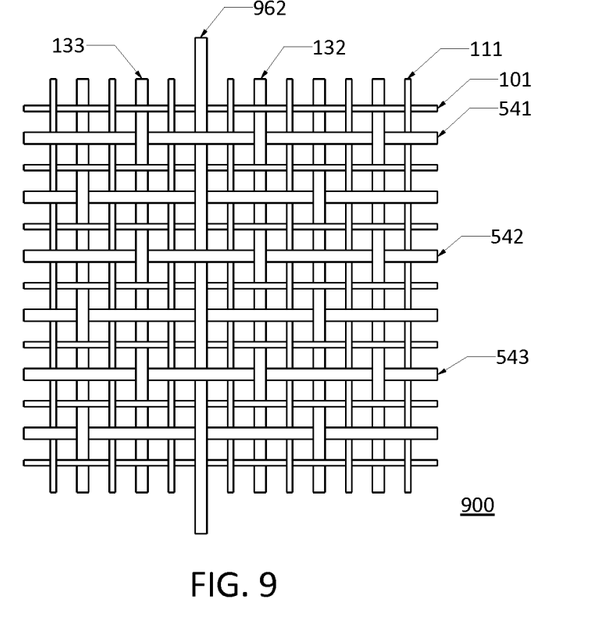
FIG. 9 is the fabric from FIG. 5 with a vertical cutting wire woven into the fabric.
Figure 10:
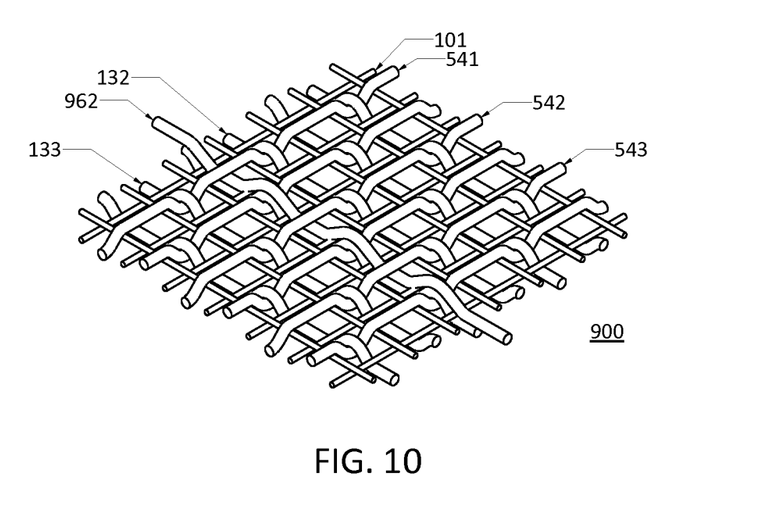
FIG. 10 is a top isometric view of the fabric from FIG. 9.

To attain the desired effect, the break in the horizontal conductive connecting fibers must be between the same two vertical conductive signal fibers all the way down the fabric. FIG. 9 shows vertical cutting fiber 962 included in the weave. Pulling up on cutting fiber 962 cuts the horizontal conductive connecting fibers between vertical conductive signal fibers 133 and 132. In a preferred embodiment, fiber 962 is an electrically and thermally conductive fiber that is heated up by passing a current through it so it breaks horizontal conductive crossing fibers 541-543 by melting them. As shown in FIG. 8, this process has the additional benefit of forming caps 801 and 802 of melted material at the newly created ends to keep the broken fibers from unraveling in the weave. Unintentionally melting adjacent non-conductive fibers or conductive signal fibers can be controlled by using conductive connecting fibers with a lower melting point than the other fibers in the fabric.

To detect a contact event, the ends of horizontal strips and vertical strips of fabric 700 are connected to control electronics. In a preferred embodiment, the fibers connect to a flex circuit that runs around the perimeter of the fabric. In turn, the flex circuit runs circuit traces from the fiber contacts to control electronics.

Figure 11:
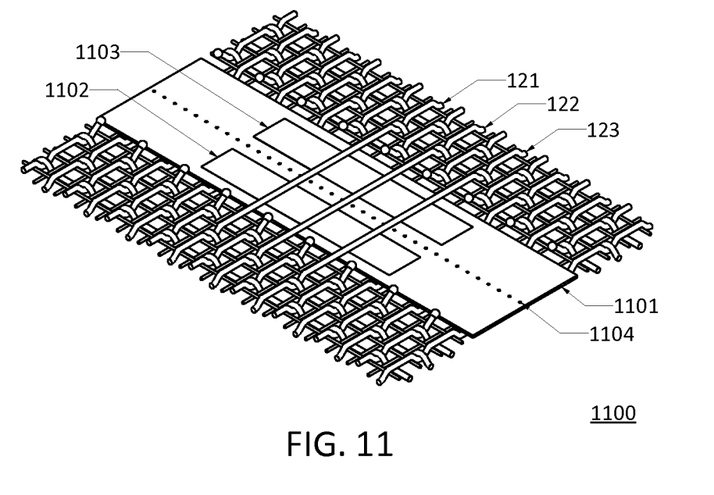
FIG. 11 is a top isometric view of a section of fabric showing a flex circuit ribbon woven in with the fibers.
Figure 12:
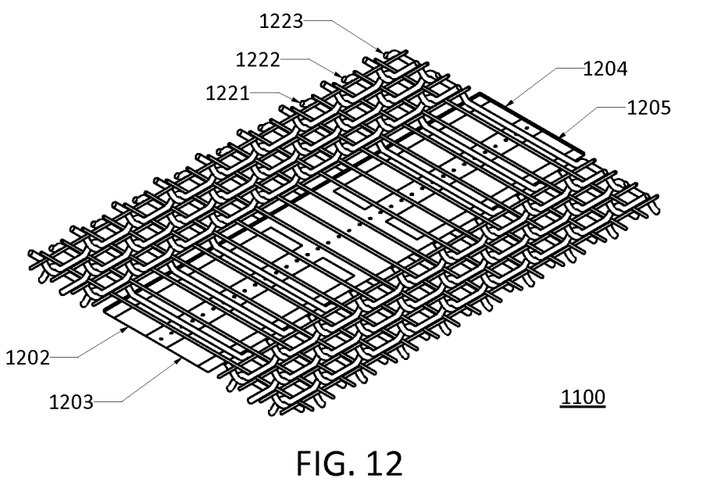
FIG. 12 is a bottom isometric view of the fabric from FIG. 11.

In a preferred embodiment, the flex circuit is a ribbon embedded in the fabric during the weaving process. As shown in FIG. 11, the conductive signal fibers of the horizontal strip composed of horizontal conductive signal fibers 121-123 pass over ribbon 1101 and are connected to pads 1102 and 1103 on the front side while the signal fibers of adjacent strips pass under ribbon 1101 and are connected on the back side. Strips alternate between connecting to the top and bottom of ribbon 1101. By alternating strips between top and bottom ribbon connections, the contact pads can be oversized without shorting together. This simplifies assembly as it relaxes alignment requirements between fibers and ribbons.

Figure 13:
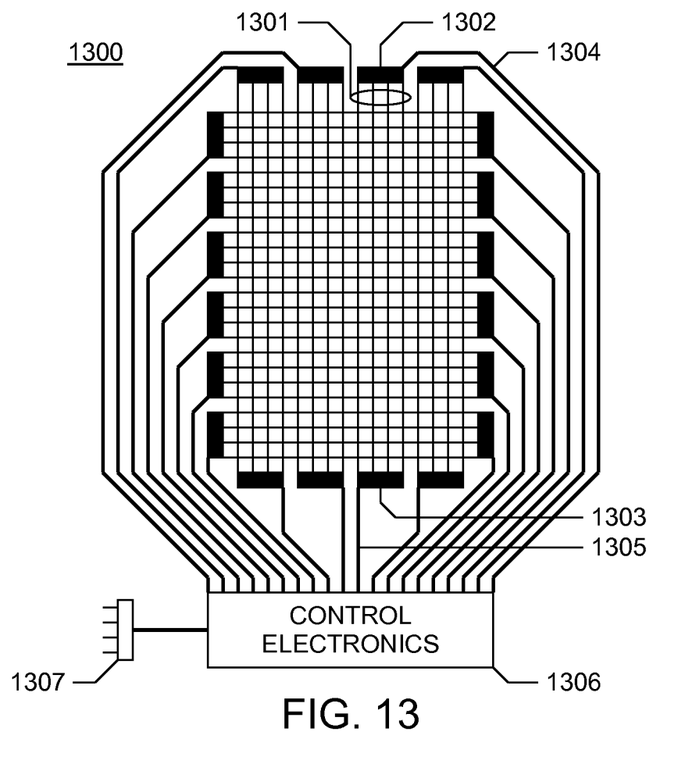
FIG. 13 is a schematic view of the sensor connections to the control electronics.

The control electronics shown in FIG. 13 sends driving voltages and currents to the sensor contact pads and measures signals coming from the sensor contact pads. The driving and measuring allows the control electronics to detect and locate touches to the sensor. The touch information is then communicated to a host computer via connection 1307.

Figure 14:
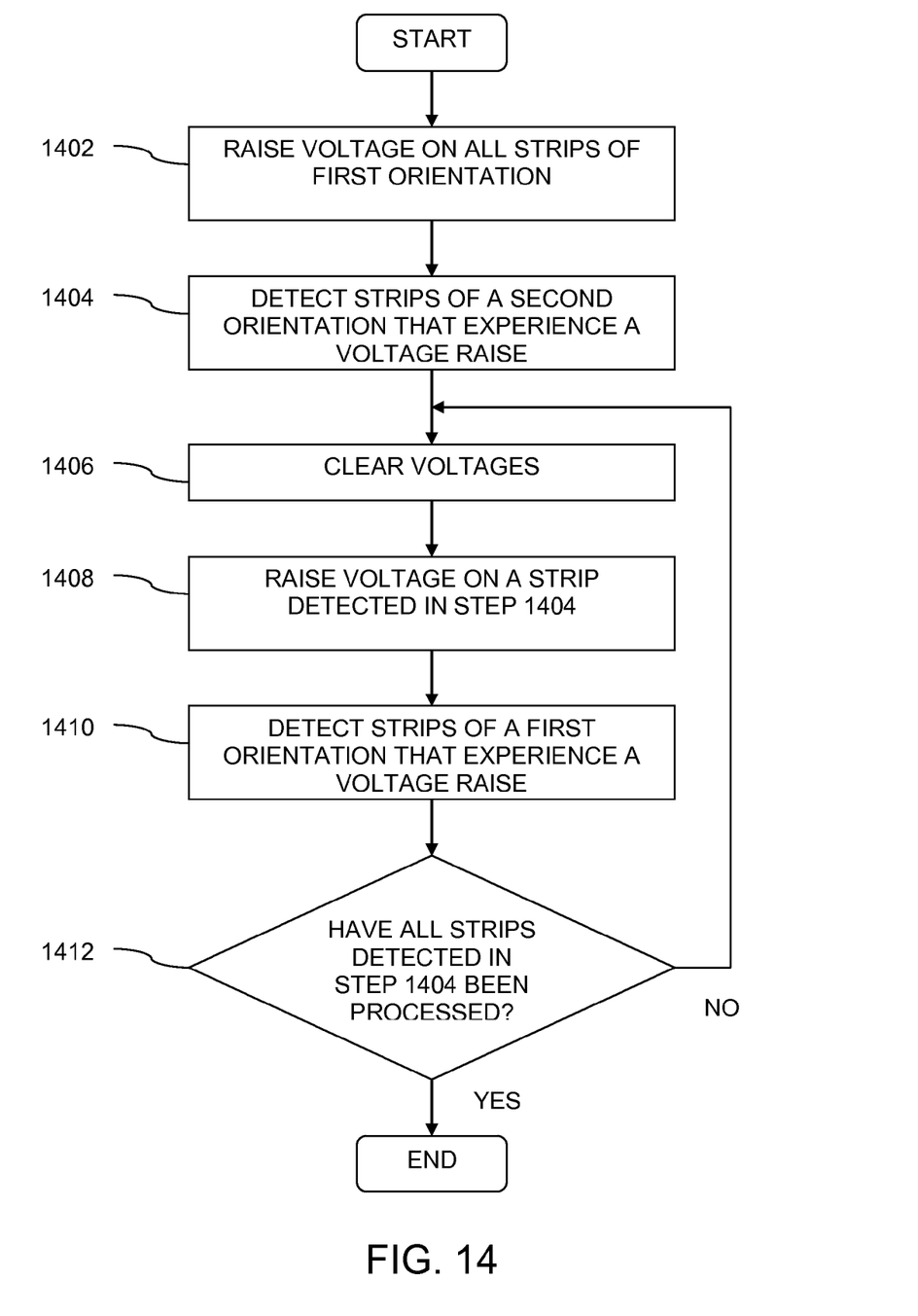
FIG. 14 is a flow chart of a method for conducting a search of a plurality of strips to identify strips experiencing touch points.

Parallel searching is an efficient technique for identifying strips in a first orientation that are contacting strips in a second orientation due to touches. FIG. 14 illustrates a flow chart of method 1400 for conducting a parallel search of a plurality of strips to identify all strip intersections that are experiencing a touch.

In step 1402 control electronics 1306 raises the voltage of all strips in a first orientation of fabric 700. In step 1404, control electronics 1306 detect the strips in a second orientation that experience a voltage increase. In step 1406 control electronics 1306 clears the voltages on all strips. In step 1408, control electronics 1306 raises the voltage of one of the strips identified in step 1404. In step 1410 control electronics 1306 detects strips in the first orientation experiencing a voltage increase to identify the intersecting strips experiencing a touch point. In step 1412, if there are additional strips identified in 1404 that have not been processed, then control electronics 1306 loops to step 1406. Otherwise, processing by method 1400 ends having identified all strip intersections experiencing a touch.

Figure 15:
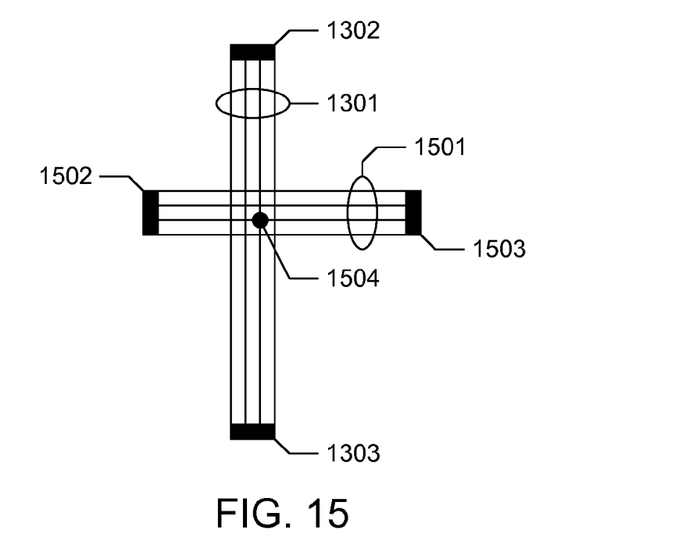
FIG. 15 shows two overlapping strips where the vertical strip is driven by a voltage gradient picked up by the horizontal strip at a point of touch.
Figure 16:
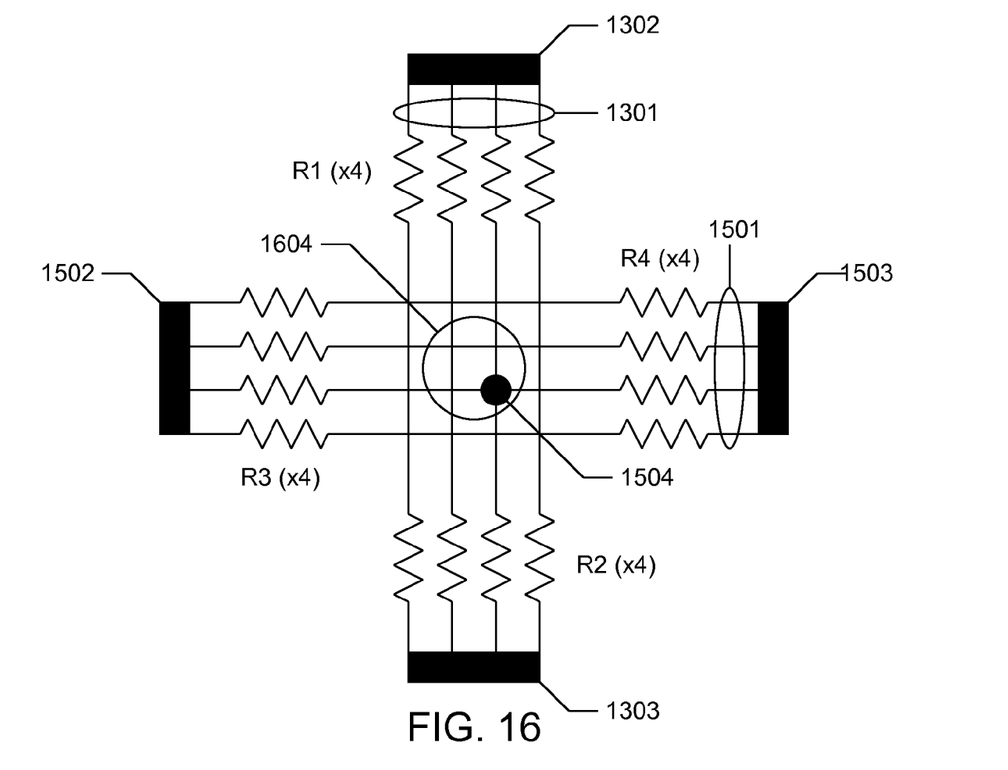
FIG. 16 is a schematic representation of two overlapping strips showing the fiber resistances.
Figure 17:
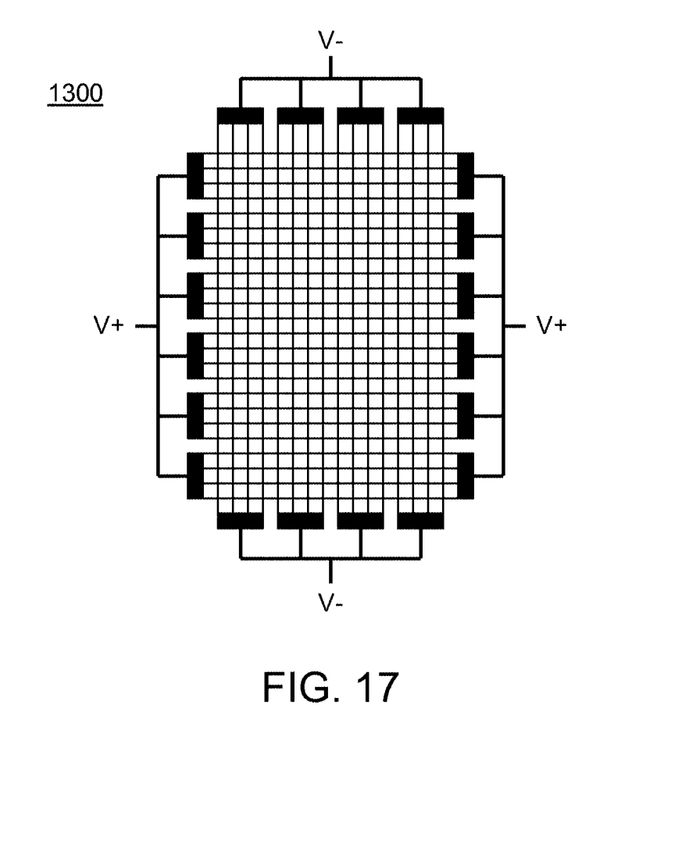
FIG. 17 shows the sensor configured for sleep mode.

FIG. 16 helps to explain the method for determining which fibers within crossing strips are contacting one-another. The control electronics drive contact 1302 to a voltage V+ and connect 1303 to ground to set up a voltage gradient in linearly resistive strip 1301. A horizontal conductive signal fiber in strip 1501 is contacting a vertical conductive signal fiber in strip 1301 due to a touch at location 1504. The voltage Vi of strip 1301 at the touch point can be read at contract 1503. If, through a prior calibration process, the value of the voltage in strip 1301 where it intersects the top fiber in strip 1501 is known to be Vn and where it intersect the bottom fiber in strip 1501 is known to be V0, then the number i of the fiber in strip 1501 is equal to $N*(Vi-V0)/(Vn-V0)$ where N is the number of fibers in strip 1501.

I claim:

1. A touch sensor pad:

a plurality of horizontal conductive signal fibers wherein each horizontal conductive signal fiber is separated by at least one horizontal nonconductive fiber;

a plurality of vertical conductive signal fibers wherein each vertical conductive signal fiber is separated by at least one vertical nonconductive fiber; wherein the horizontal conductive and nonconductive fibers are woven into a fabric with the vertical conductive and nonconductive fibers and the intersections between the horizontal and vertical conductive signal fibers are only in electrical contact in response to a touch pressure normal to the plane defined by the fabric at a location near or at the intersections;

a plurality of horizontal conductive connecting fibers are placed between the horizontal conductive signal fibers wherein the horizontal conductive connecting fibers have a resistance lower than the resistance of the horizontal conductive signal fibers;

a plurality of vertical conductive connecting fibers are placed between the vertical conductive signal fibers wherein the vertical conductive connecting fibers have a resistance lower than the resistance of the vertical conductive signal fibers, wherein the horizontal and vertical conductive connecting fibers are interwoven into the fabric and wherein each horizontal conductive connecting fiber is in electrical contact with a plurality of vertical conductive signal fibers and wherein each vertical conductive connecting fiber is in electrical contact with a plurality of horizontal conductive signal fibers; and control electronics connected to the ends of the horizontal conductive signal fibers and the ends of the vertical conductive signal fibers can place a voltage gradient on the ends of the horizontal conductive signal fibers while detecting the voltage at the ends of the vertical conductive signal fibers to determine the point of the touch pressure on the fabric in the horizontal direction, and can place a voltage gradient on the ends of the vertical conductive signal fibers while detecting the voltage at the ends of the horizontal conductive signal fibers to determine the point of the touch pressure on the fabric in the vertical direction.

2. The touch sensor pad in claim 1, wherein a plurality of adjacent horizontal conductive signal fibers are electrically connected together by vertical conductive connecting fibers to form horizontal groups wherein horizontal groups are not connected to one another and a plurality of adjacent vertical conductive signal fibers are electrically connected together by horizontal conductive connecting fibers to form vertical groups wherein vertical groups are not connected to one another and wherein the groups are connected to the control electronics.

3. The touch sensor pad of claim 1, wherein a flexible circuit ribbon is woven into the touch sensor fabric at intervals that determine the edges of individual touch sensors, wherein the conductive signal fibers within any one group are on one side of the ribbon when crossed and the conductive signal fibers of both adjacent groups are on the other side of the ribbon when crossed, and wherein the conductive signal fibers of each group are electrically connected to a pad on the ribbon so each group is connected to a separate pad, and where circuit traces on the ribbon connect said pads to control electronics.

4. The touch sensor pad of claim 3, wherein one ribbon forms the edge of the touch sensor disposed on either side of the sensor fabric and wherein individual sensors are cut from the fabric by cutting down the lengths of the ribbons.

5. The touch pad sensor of claim 1, wherein the contact area of a touch on two intersecting groups is determined by measuring the resistance of the groups.

6. The touch pad sensor of claim 1, wherein the sensor is put into a sleep mode by driving a voltage potential between horizontal and vertical conductive signal fibers wherein current only flows when touched and wherein said current flow causes the sensor to exit said sleep mode.

* * * * *